(12) United States Patent
Kikuchi et al.

(10) Patent No.: US 7,973,529 B2
(45) Date of Patent: Jul. 5, 2011

(54) SENSOR MAGNET HOLDER FOR USE IN MOTOR AND ITS MANUFACTURING PROCESS

(75) Inventors: Satoshi Kikuchi, Matsudo (JP); Takahiro Akimoto, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 206 days.

(21) Appl. No.: 12/495,338

(22) Filed: Jun. 30, 2009

(65) Prior Publication Data

US 2010/0001719 A1    Jan. 7, 2010

(30) Foreign Application Priority Data

Jul. 4, 2008  (JP) ................................. 2008-175240

(51) Int. Cl.
*G01B 7/30* (2006.01)
(52) U.S. Cl. ............... 324/207.25; 324/207.15; 324/173
(58) Field of Classification Search ............. 324/207.25, 324/207.15, 173
See application file for complete search history.

(56) References Cited

U.S. PATENT DOCUMENTS 4,181,867 A * 1/1980 Muller ..................... 310/156.34
2009/0001839 A1 * 1/2009 Masayuki et al. ....... 310/156.16

FOREIGN PATENT DOCUMENTS

| JP | 7-38967 U | 7/1995 |
| JP | 2003-164113 A | 6/2003 |
| JP | 2005-348525 A | 12/2005 |

* cited by examiner

*Primary Examiner* — Reena Aurora
(74) *Attorney, Agent, or Firm* — Knoble Yoshida & Dunleavy, LLC

(57) ABSTRACT

A sensor magnet holder is mounted on a motor shaft, and a sensor magnet is provided relative to a magnetic induction sensor on the non-moving side for obtaining a signal indicative of a rotational position of the motor shaft. The sensor magnet holder integrally forms a cylindrical portion, a flange portion of a terminal end of the cylindrical portion having a large diameter, a magnet rear end holding portion of the other terminal end of the cylindrical portion and a plurality of snap fit board portions. A shaft press fit portion is formed on an internal diameter of the flange portion. The plural snap fit board portions extend from the cylindrical portion in an axial direction of the motor shaft. A magnet front end holding portion is formed at an extending tip over an outer diameter surface of each of the snap fit board portions. Each of the flexible snap fit board portions snuggly contacts the inner flat surface of the sensor magnet while the sensor magnet is held between said magnet rear end holding portion and said magnet front end holding portion.

11 Claims, 5 Drawing Sheets

SENSOR MAGNET HOLDER FOR USE IN MOTOR AND ITS MANUFACTURING PROCESS

FIELD OF THE INVENTION

The current invention is generally related to a holder for housing sensor magnets and a motor incorporating the same holder and more particularly related to the sensor magnet device that generates a signal indicative of the rotor angular position by detecting a magnetic position in response to the motor shaft rotation. The current invention is related to the above-described holder, the motor incorporating the same holder and their manufacturing process.

BACKGROUND OF THE INVENTION

In a small motor, a rotation detection device for detecting a rotational speed or position has been integrated into a motor rational component such as a motor shaft. For example, these rotation detection devices have been used to gain the angular positional information in brushless motors. As already known in prior art, in the brushless motor, a magnet known as a sensor magnet is installed on the rotational shaft while a magnetic induction sensor is placed near the sensor magnet. The sensor magnet forms the alternate magnetic poles along the direction of a circumference. Since the sensor magnet has been magnetized to correspond to the magnetic pole position of a permanent magnet that is installed in a motor, as the motor shaft rotates, the magnetic induction sensor detects a change in the magnetic pole position in the sensor magnet, and the detected change corresponds to the rotor rotational change.

Incidentally, the rotation detection device detects a rotational speed or position in a motor with a worm gear speed reduction device, and the detected rotational speed and position are used to control the speed reduction. See Japanese Patent Publications 2003-164113 and 2005-348525. In a motor with a worm gear speed reduction device, the motor shaft rotational drive is outputted to the output shaft via a worm or a worm wheel. For example, in an automotive power window system, a window glass is raised and lowered via a window glass lifting and lowering mechanism. In order to detect a position and a speed of the window glass, a motor with a worm gear speed reduction device is installed in the automotive power window system.

In the rotation detection device, the sensor magnet has been placed on the motor shaft inside the motor housing or on the motor shaft extending outside the motor housing. Referring to FIG. 5, a diagram illustrates a prior art technique for placing a sensor magnet on the motor shaft as disclosed in Japanese Utility Model Publication Hei 7-38967. FIG. 5A is an expanded prospective view while FIG. 5B is a partial frontal cross sectional view. A sensor magnet 20 as a detected object is held in a sensor magnet holder 10 around the outer surface of a motor shaft 30 and is juxtaposed to a commutator 40. The sensor magnet holder 10 is integrated by a resin and includes a plurality of holding portions 10C at equidistance along the circumference. Each holding portion 10C is integrally connected to a ring-shaped connecting portion 10D at a rear portion of the sensor magnet holder 10. At a frontal portion 1 of each holding portion 10C around the circumference, a frontal engagement portion 10B protrudes outwardly along the diameter. On the other hand, at a rear portion of each holding portion around the circumference, a rear engagement portion 10A protrudes outwardly along the diameter. Both of the engagement portions 10A and 10B respectively engage the corresponding end surface of the sensor magnet 20 that is press fit by the outer circumference in the holding portion 10C.

The sensor magnet 20 integrally forms a concave portion 22, and a rotation-locking convex portion 14 of the sensor magnet holder 10 engages with the concave portion 22 in order to lock the circumferential position. An outer surface of the motor shaft 30 has a position-locking groove 32 to prevent the sensor magnet 20 from moving away from the commutator 40. On the other hand, a plurality of convex portions 12 at the rear portion of the magnet holder 10 protrudes in the inward direction along the diameter. These convex portions 12 are formed to engage inside the position-locking groove 32. Furthermore, by extending a knurl 50 for fixing an armature and a commutator 40 on the outer surface of the motor shaft 30, the sensor magnet 20 and the motor shaft 30 compress the resin of the holding portion so as to be distorted along the concave and convex portions of the knurl 50. Consequently, the holding portion 10C and the motor shaft 30 are fixedly connected with each other.

The illustrated prior art rotation detection device has complex structural forms for determining the sensor magnet position and fixing the sensor magnet with respect to the magnet holder. By the same token, the prior art rotation detection device also has complex structural forms for determining the magnet holder position and fixing the magnet holder with respect to the motor shaft. Furthermore, the torque is not sufficiently large in the prior art for preventing the sensor magnet from rotating in the circumferential direction.

The illustrated prior art rotation detection device assumes its juxtaposition to the commutator. However, if the rotation detection device is placed near a worm gear, lubricating grease of the worm gear may flow over a Hall effect sensor.

The current invention solves the above described prior art problems. The motor shaft itself does not need the prior art knurl for fixing a sensor magnet or the prior art position-determining groove. One object of the current invention is to provide a sensor magnet holder that enables a sufficiently tight press fit against the motor shaft for fixing the sensor magnet with respect to the motor shaft.

Another object of the current invention is to prevent the magnet from damage by eliminating a large amount of force such as press fit as needed by prior art in placing a magnet in a magnet holder via a motor shaft. Yet another object of the current invention is to securely fix the magnet at the inserted position both in the shaft axis direction and the shaft rotational direction.

Lastly, another object of the current invention is to prevent lubricating grease of the worm gear from flowing over a Hall effect sensor.

SUMMARY OF THE INVENTION

In order to solve the above and other problems, according to one aspect of the current invention, a sensor magnet holder is mounted on a motor shaft, and a sensor magnet is provided relative to a magnetic induction sensor on the non-moving side for obtaining a signal indicative of a rotational position of the motor shaft. The sensor magnet holder integrally forms a cylindrical portion, a flange portion of a terminal end of the cylindrical portion having a large diameter, a magnet rear end holding portion of the other terminal end of the cylindrical portion and a plurality of snap fit board portions. A shaft press fit portion is formed on an internal diameter of the flange portion. The plural snap fit board portions extend from an inner diameter of the cylindrical portion in an axial direction of the motor shaft. A magnet front end holding portion is formed at an extending tip over an outer diameter surface of each of the snap fit board portions. Each of the snap fit board portions snuggly contacts the inner flat surface of the sensor magnet due to the flexibility while the sensor magnet is held between said magnet rear end holding portion and said magnet front end holding portion.

According to other aspects of the current invention, an internal diameter of the snap fit board portions is larger than that of said shaft press fit portion, and an empty space is formed between an outer surface of the motor shaft and the snap fit board portions. Furthermore, the snap fit board portions further forms a shaft contacting portion at an extending tip over an inner diameter surface of each of said snap fit board portions. The magnet rear end holding portion further includes a plurality of bosses on an end surface for contacting the sensor magnet by collapsing the tip of the bosses to fix the sensor magnet in the axial direction of the motor shaft.

According to other aspects of the current invention, a motor or a manufacturing method of the motor includes a step of press fitting a sensor magnet holder holding a sensor magnet on a motor shaft.

The current invention is to fix the sensor magnet holder on the motor shaft not by applied force on the sensor magnet but by press fitting via the press fit portions of the sensor magnet holder which fixedly positions a magnet. The current invention enables sufficient strong press fit while it makes harder to damage the magnet. By the above press fit, the shaft and the sensor magnet holder improve moving resistance. Furthermore, the rectangular inner surfaces of the sensor magnet improve anti-rotational torque of the sensor magnet.

The current invention lacks some additional process such as the knurl process or a positional groove on the motor shaft so as to eliminate a cause of bending the shaft. The current invention enables a low-cost solution for fixing the sensor magnet both in the axial and rotational directions. The sensor magnet and the sensor magnet holder are engaged by press fit, and the sensor magnet does not become free after inserting onto a shaft.

The current invention is to prevent lubricating grease of the worm gear from flowing over a Hall effect sensor.

According to the current invention, since the snap fit board portions snuggly contacts the inner flat surface of the sensor magnet due to the flexibility, the sensor magnet and the sensor magnet holder lack a concave portion and a convex portion along the axial direction for an anti-rotational purpose. Consequently, a manufacturing process improves its operability. These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding Japanese priority document (2008-175240 filed on Jul. 4, 2008) from which the current application claims priority. The current invention involving a sensor magnet positioned and fixed on the shaft is applicable to all prior art small motors such as brushless motors and motors with a worm-gear speed reduction device whose rotational speed and angular position need to be detected. In the following, embodiments according to the current invention will be described with respect to exemplary motors with a worm-gear speed reduction device.

Figure 1:
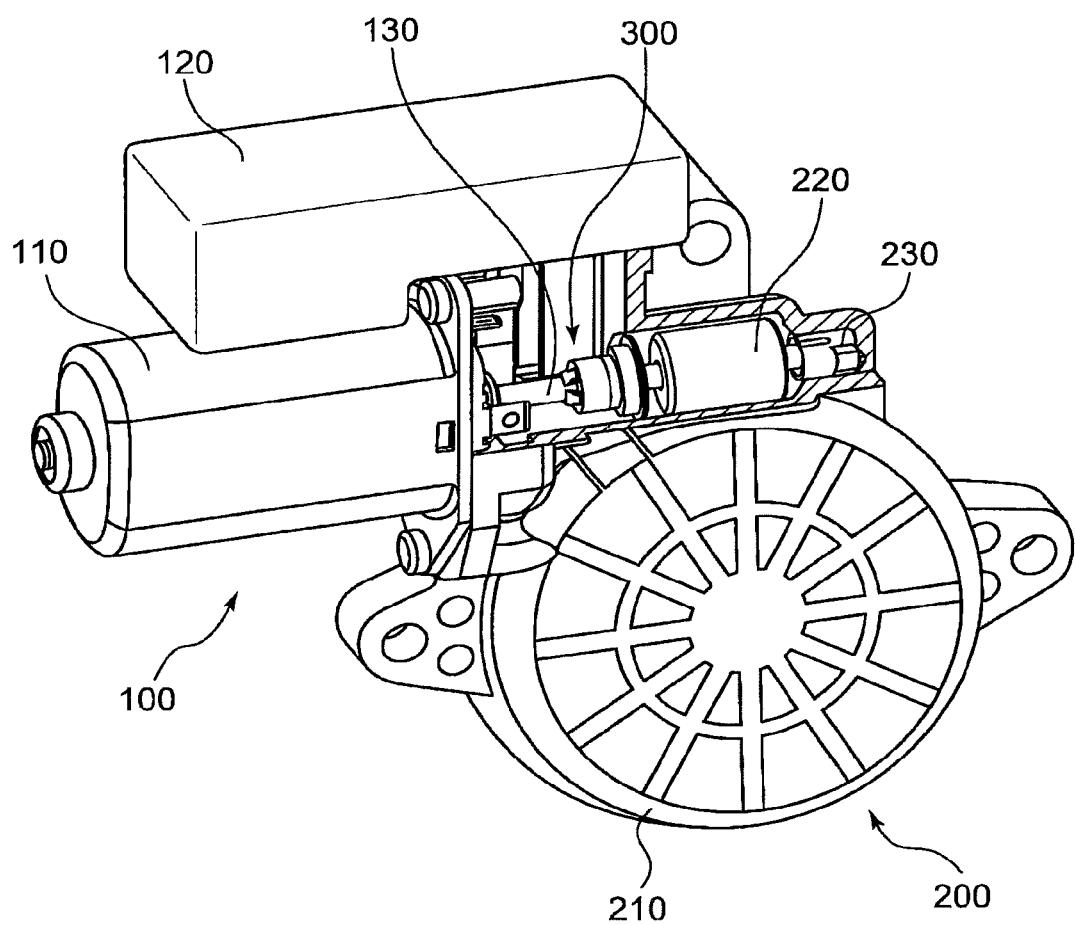
FIG. 1 is a diagram illustrating a prospective view with a partial cross sectional surface of an overall structure of a motor with a worm-gear speed reduction device including a rotation detection unit.
Figure 2A:
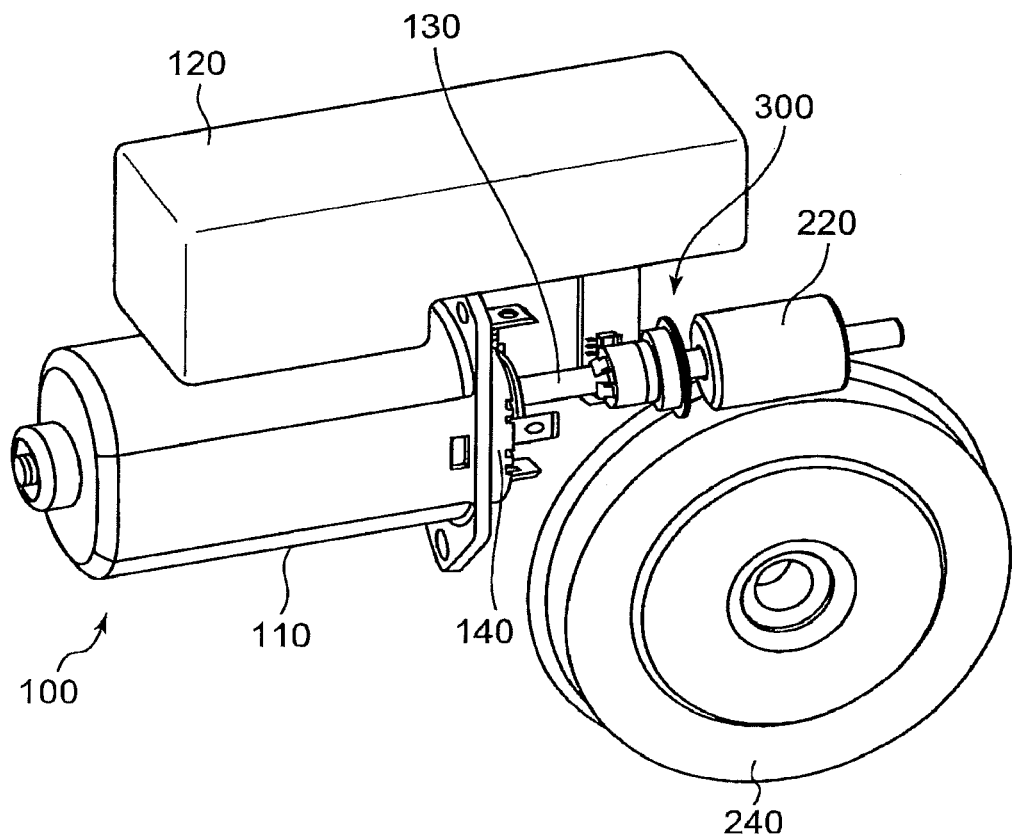
FIG. 2A is a diagram illustrating a prospective view of the above motor in FIG. 1 without a speed reduction device case so as to fully reveal a rotation detection unit.
Figure 2B:
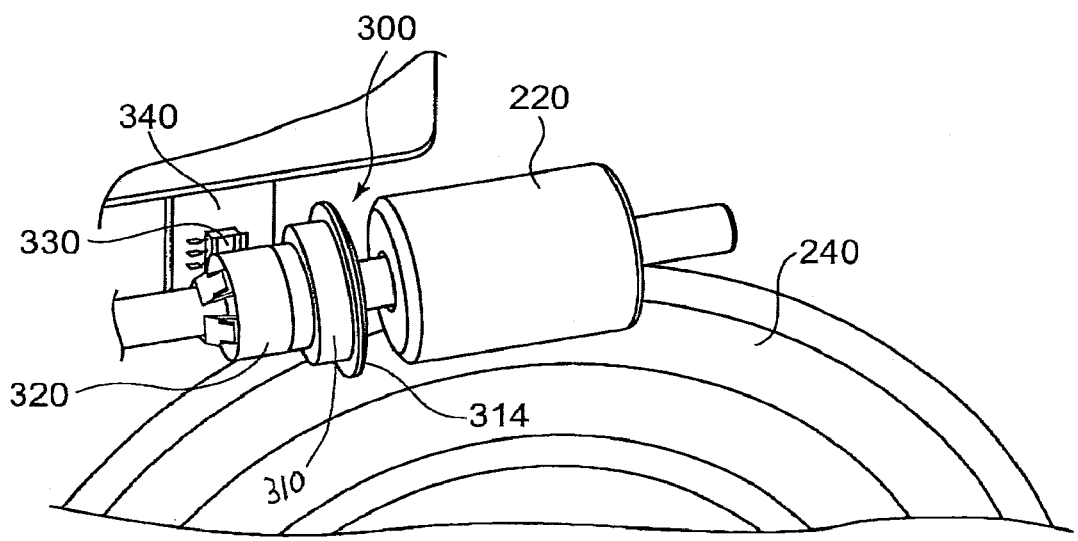
FIG. 2B is a diagram illustrating an enlarged prospective view of the speed reduction device.

Referring now to the drawings, wherein like reference numerals designate corresponding structures throughout the views, and referring in particular to FIG. 1, a prospective view with a partial cross sectional surface illustrates an overall structure of a motor with a worm-gear speed reduction device including a rotation detection unit. FIG. 2A is a prospective view of the above motor in FIG. 1 without a speed reduction device case 210 so as to fully reveal a rotation detection unit 300. FIG. 2B is an enlarged prospective view of the speed reduction device. The speed reduction device 200 and a controller 120 are connected to the motor 100 by a certain means such as bolts. The motor 100 is generally a DC brush motor and is formed in a shape having a bottom and a hollow cylinder. The motor 100 further includes a motor housing having magnets on the internal surfaces and an end bell cover 140 for closing the open end portion of the motor housing. A bearing 230 provided in the speed reduction device case 210 supports a terminal portion of the motor shaft 130, which extends outside the end bell cover 140 of the motor 100.

The speed reduction device 200 further includes a worm gear 220, which connected to the extending motor shaft 130, a worm wheel 240, which is engaged with the worm gear 220 and a drive shaft (not illustrated) extending from the center of the worm wheel 240. For example, the drive shaft is connected to an automotive power window mechanism.

The rotation detection unit 300 includes a combination of a sensor magnet 320 mounted on a rotational body, a magnetic induction sensor 330 such as a Hall effect sensor mounted on a stationary body. The exemplary Hall effect sensor 330 is fixed on a board 340 of the controller 120 so as to relate to the rotatable sensor magnet 320. Since the above described rotation detection unit 300 provides current to the Hall effect sensor 330 and includes electrical wires for obtaining signals, the Hall effect sensor 330 detects a change in magnetic flux from the magnetic pole according to the relative movement of the sensor magnet 320 in response to the motor rotation. Thus, the rotation detection unit 300 generates pulse signals based upon the above detected change. Consequently, by the generated pulse signals, the motor rotational speed and the motor angular position are detected and controlled.

Now referring to FIG. 3, a diagram singularly illustrates an embodiment of the sensor magnet holder according to the current invention. FIGS. 3A and 3B are respectively a prospective view at a different angle of the embodiment of the sensor magnet holder according to the current invention. FIG. 3C is a perspective cross sectional view of the embodiment of the sensor magnet holder according to the current invention. FIG. 3D is an enlarged cross sectional view of a portion X indicated by a dotted circle in FIG. 3C of the embodiment of the sensor magnet holder according to the current invention. For example, the illustrated sensor magnet holder 310 is manufactured by resin such as glass-containing nylon and by integrally forming a cylindrical portion, a flange portion 314 having a large diameter at one end of the cylindrical portion 312, a round rear magnet holding portion 315 at the other end of the cylindrical portion 312 and four snap fit board portions 318. Since the flange portion 314 at one enlarged end of the cylindrical portion 312 is also located at a terminal portion of the sensor magnet holder 310, the enlarged flange portion 314 thus prevents lubricating grease of the worm gear 220 from flowing over a Hall effect sensor as seen in FIGS. 3A and 2B. A press fit portion 317 for press fitting the motor shaft 130 encompasses an area defined by the internal diameter of the cylindrical portion 312, which also includes the flange portion 314.

The four snap fit board portions 318 are provided by extending from the internal diameter of the cylindrical portion 312 along the motor shaft axis. At the end portion X of the snap fit board portions 318 as indicated by the dotted circle line in FIG. 3C, a magnet front end holding portion 311 is formed over an outer diameter surface of each of the snap fit board portions 318. As illustrated in an enlarged view in FIG. 3D, the magnet front end holding portion 311 forms on the outer diameter surface a vertical magnet holding wall 311A and a slanted surface 311B extending towards a terminal end. The magnet front end holding portion 311 also forms on the inner diameter surface a shaft contacting portion 311C, which protrudes towards the motor shaft in order to support the motor shaft.

Figure 4A:
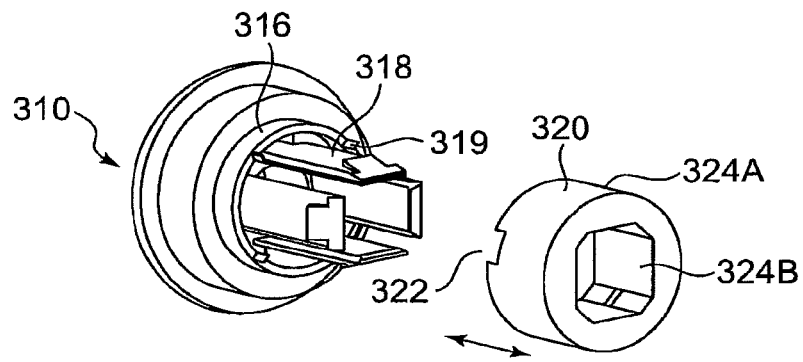
FIG. 4A is a diagram illustrating a juxtaposed and prospective view of a sensor magnet and the sensor magnet holder.
Figure 4B:
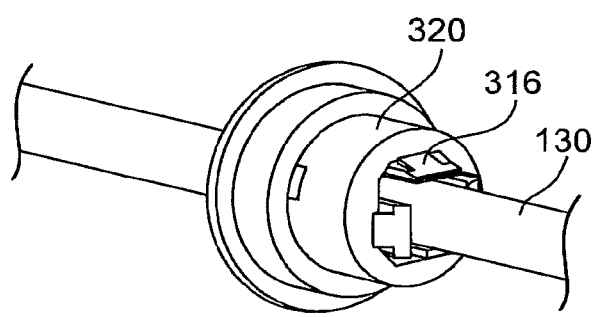
FIG. 4B is a diagram illustrating an installed and prospective view of a sensor magnet and the sensor magnet holder.
Figure 4C:
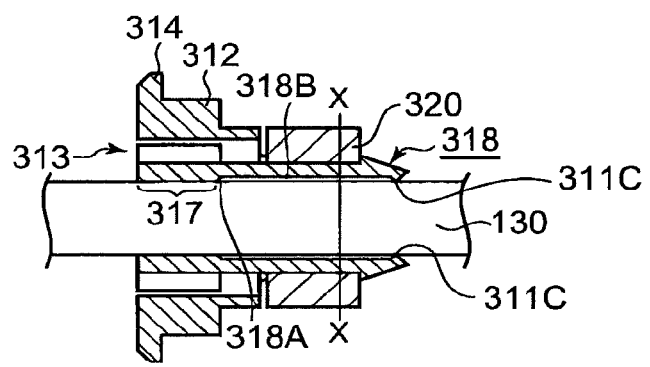
FIG. 4C is a diagram illustrating a cross sectional view of a sensor magnet and the sensor magnet holder after installation.

As will be illustrated in FIG. 4C, since the motor shaft 130 and an internal surface of the snap fit board portions 318 are arranged to form a gap 318B between them, each of the snap fit board portions 318 is connected to the cylindrical portion 312 to form a step 318A along the internal diameter. In other words, the internal diameter of the snap fit board portions 318 is larger than that of the press fit portion 317, which also corresponds to the internal diameter of the cylindrical portion 312 including the flange portion 314. With the above described structural elements, only the internal surfaces of the cylindrical portion 312 and the shaft contacting portions 311C are press fitting against the outer surface of the motor shaft 130.

Figure 3A:
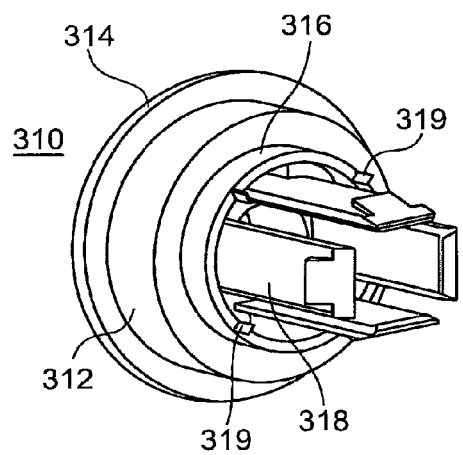
FIGS. 3A and 3B are respectively a diagram illustrating a prospective view at a different angle of the embodiment of the sensor magnet holder according to the current invention.
Figure 3B:
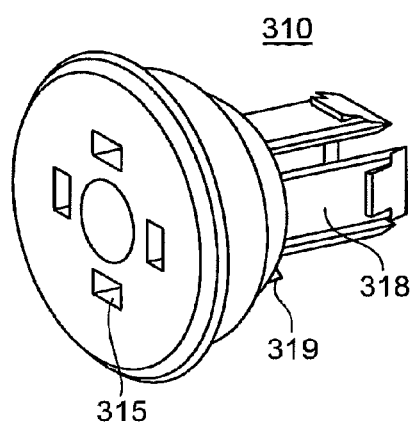
Figure 3C:
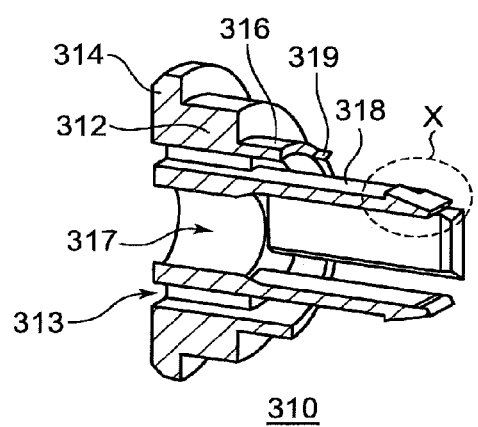
FIG. 3C is a diagram illustrating a perspective cross sectional view of the embodiment of the sensor magnet holder according to the current invention.

A magnet rear end holding portion 316 having a cylindrical structure is located at an end surface of the cylindrical portion 312, and its terminal surface has a plurality of bosses 319. As will be later described, when a sensor magnet 320 is held between the magnet rear end holding portion 316 and the magnet front end holding portion 311 having a snap fit tip, the magnet rear end holding portion 316 securely fixes the sensor magnet 320 along the motor shaft direction by collapsing the tip of the bosses 319. Although four through holes 315 as illustrated in FIGS. 3B and 3C are not functionally necessary for the sensor magnet holder 310, they are used for inserting metal mold pins during the manufacture of the sensor magnet holder 310. These through holes 315 are blocked by the sensor magnet 310, which is installed on the sensor magnet holder 310.

Now referring to FIG. 4, the diagrams illustrate the installation of a sensor magnet on the motor shaft via an embodiment of the sensor magnet holder according to the current invention. FIG. 4A is a diagram illustrating a juxtaposed and prospective view of a sensor magnet and the sensor magnet holder. FIG. 4B is a diagram illustrating an installed and prospective view of a sensor magnet and the sensor magnet holder. FIG. 4C is a diagram illustrating a cross sectional view of a sensor magnet and the sensor magnet holder after installation. FIG. 4D is a diagram illustrating a cross sectional view of a sensor magnet and the sensor magnet holder at a plane X-X of FIG. 4C.

As shown in FIG. 4A, the sensor magnet 320 has a certain thickness along the motor shaft direction as indicated by a double-headed arrow, a circular outer surface 324A and four flat internal surfaces 324B. Although the four internal surfaces 324B may have round corners as illustrated in FIG. 4A, each of the four internal surfaces 324B has a sufficiently flat surface for properly contacting the snap fit board portions 318. One example of the sensor magnet 320 is made of ferrite resin magnet and has alternate magnetic poles such as four magnetic poles along its circumference. Although a gate opening 322 as illustrated in FIG. 4A is not functionally necessary for the sensor magnet 320, it is a pouring opening mark used for pouring plastic compound during the manufacture of the sensor magnet 320.

Figure 3D:
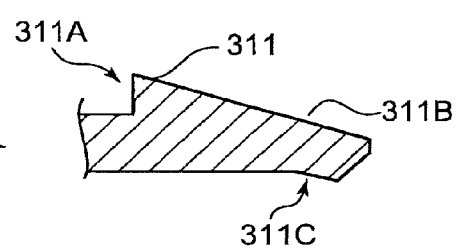
FIG. 3D is a diagram illustrating an enlarged cross sectional view of a portion X indicated by a dotted circle in FIG. 3C of the embodiment of the sensor magnet holder according to the current invention.

In a manufacturing process of the above described embodiment of the sensor magnet holder according to the current invention, the sensor magnet 320 is initially engaged in the sensor magnet holder 310. At that time, since the snap fit board portions 318 are bent towards the inner area due to the flexibility, it is easy to arrange each of the four snap fit board portions 318 to properly contact the corresponding one of the four inner flat surfaces 324B of the sensor magnet 320. Since the magnet front end holding portion 311 forms a vertical magnet holding wall 311A and a slanted surface 311B as shown in FIG. 3D, the sensor magnet 320 is easily inserted via the slanted surface 311B while after the insertion, the vertical magnet holding wall 311A is designed to prevent the sensor magnet 320 from moving from the inserted position. Thus, the sensor magnet 320 is easily positioned along the motor shaft direction between the magnet front end holding portion 311 and the magnet rear end holding portion 316 by the above described snap fit flexibility. Incidentally, any combination of the snap fit board portions 318, the magnet front end holding portion 311 and the magnet rear end holding portion 316 is defined to be at least a part of a magnet holding portion for holding the sensor magnet 320 in the sensor magnet holder 310. Furthermore, by collapsing the bosses 319 of the magnet touching surface, the sensor magnet 320 is securely fixed without any slack. Since the four snap fit board portions 318 properly contact the corresponding one of the four inner flat surfaces 324B of the sensor magnet 320, the sensor magnet 320 is also securely fixed against rotation on the sensor magnet holder 310.

Subsequent to the above described steps in manufacturing the embodiment of the sensor magnet holder according to the current invention, the sensor magnet holder 310 combined with the sensor magnet 320 is press fit onto the motor shaft 130 as shown in FIG. 4B. The press fit is made only by the shaft contacting portions 311C at the terminal end of the snap fit board portions 318 and the press fit portion 317 that correspond to the internal surfaces of the cylindrical portion 312 including the flange portion 314 as seen in FIG. 4C. When the sensor magnet holder 310 is press fit onto the motor shaft 130, the press fit is accomplished without damaging the sensor magnet 320 by stress from the motor shaft 130 in response to the press fit. The above accomplishment is structurally supported by the snap fit board portions 318 that are arranged to form a gap 318B with the outer surface of the motor shaft 130 except for the shaft contacting portions 311C and the press fit portion 317. In another regard, the snap fit board portions 318 are also connected to the cylindrical portion 312 to form a step 318A along the internal diameter. In other words, since it is possible to strongly press fit the sensor magnet holder 310, there is no need to process the motor shaft for restricting the movement of the sensor magnet holder 310 along the motor shaft axis.

Still referring to FIG. 4C, a diagram illustrates a cross sectional view of the motor shaft 130, the sensor magnet 320 and the sensor magnet holder 310 along the axial direction. As described above, the sensor magnet 320 is positioned along the motor shaft direction between the magnet front end holding portion 311 and the magnet rear end holding portion 316, and the area between the two holding portions 311 and 316 is defined as a sensor magnet position. The press fit is made by a combination of the press fit portion 317 and the shaft contacting portions 311C at the terminal end of the snap fit board portions 318, and the area of the above press fit is defined as a press fit position. Accordingly, the sensor magnet position fails to overlap the press fit position in the axial direction of the motor shaft 130 in the preferred embodiment of the sensor magnet holder 310 according to the current invention.

Figure 4D:
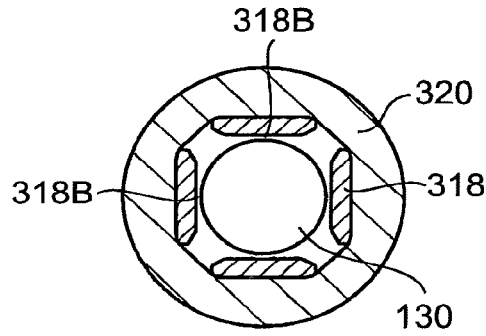
FIG. 4D is a diagram illustrating a cross sectional view of a sensor magnet and the sensor magnet holder at a plane X-X of FIG. 4C.
Figure 5A:
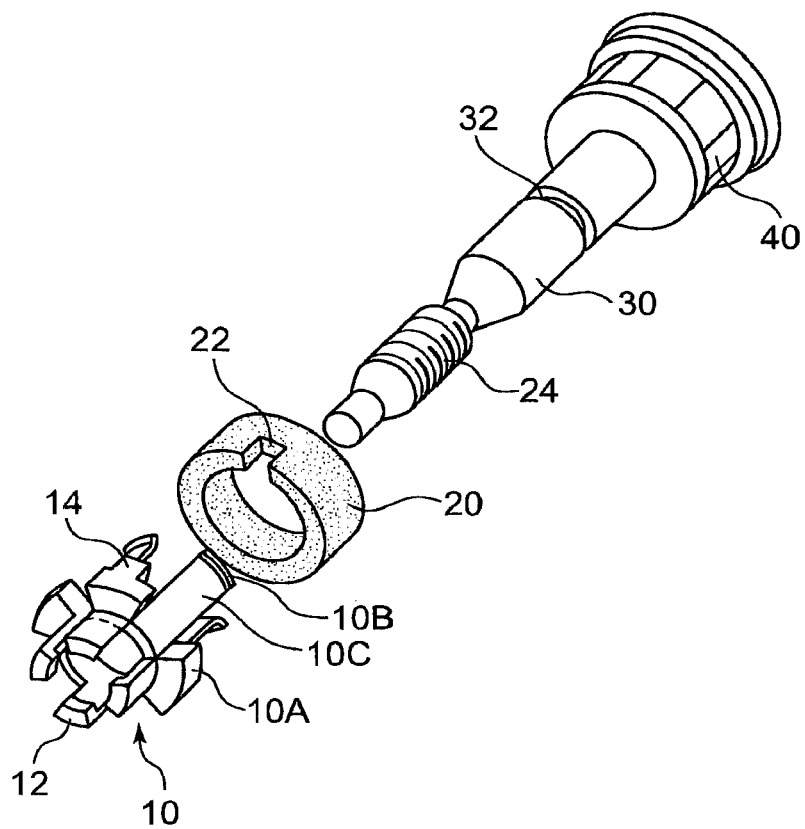
FIG. 5A is a diagram illustrating in an expanded prospective view one prior art technology for placing a sensor magnet on the motor shaft.
Figure 5B:
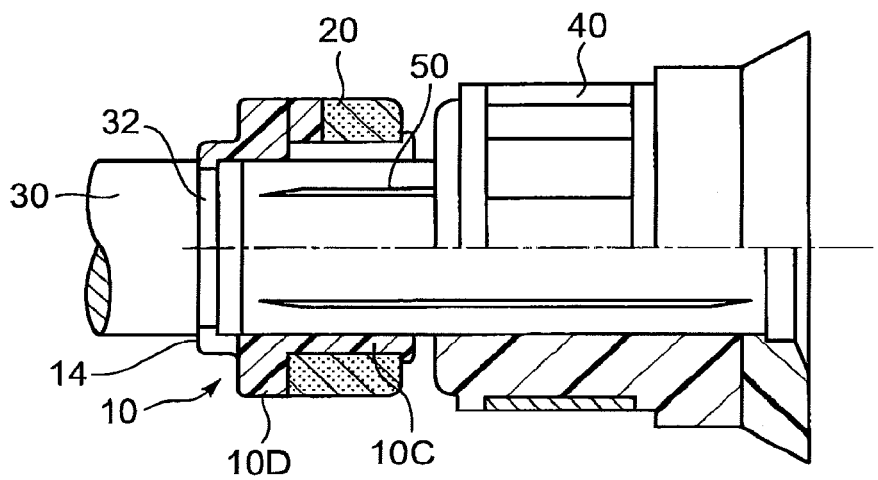
FIG. 5B is a diagram illustrating in a partial frontal cross sectional view the one prior art technology for placing a sensor magnet on the motor shaft.

Now referring to FIG. 4D, a diagram illustrates a cross sectional view of the motor shaft 130, the sensor magnet 320 and the snap fit board portions 318 at a plane X-X of FIG. 4C. When the sensor magnet 320 is mounted on the motor shaft 130 via the sensor magnet holder 310, an outer surface of each of the four snap fit board portions 318 properly contacts a corresponding one of the flat inner surfaces of the sensor magnet 320 by virtue of flexibility in the snap fit board portions 318 to substantially eliminate rotational movement of the sensor magnet 320 with respect to the sensor magnet holder 310. On the other hand, an inner surface of each of the four snap fit board portions 318 forms a gap 318b with the motor shaft 130. As already described above, when the sensor magnet holder 310 is press fit onto the motor shaft 130 via the press fit portion 317 and the shaft contacting portions 311C, the gap 318b advantageously allows the press fit without damaging the sensor magnet 320 by substantially isolating any stress from the motor shaft 130 caused by the press fit.

Furthermore, after the sensor magnet 320 is press fit without any jig at a predetermined position on the motor shaft 130, since the snap fit board portions 318 fail to bend toward the inner direction, the sensor magnet 320 are secured at the arranged position without applying any strong force to the sensor magnet 320.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A sensor magnet holder for mounting a sensor magnet on a motor shaft, the sensor magnet being provided relative to a magnetic induction sensor on the non-moving side for obtaining a signal indicative of a rotational position of the motor shaft, comprising:
   a shaft press fit portion for press-fitting the motor shaft;
   a magnet rear end holding portion; and
   a plurality of snap fit board portions, wherein said shaft press fit portion, said magnet rear end holding portion and said snap fit board portions are integrally formed, said snap fit board portions extending from an inner diameter of said shaft press fit portion in an axial direction of the motor shaft, a magnet front end holding portion being formed at an extending tip over an outer diameter surface of each of said snap fit board portions, said snap fit board portions having flexibility, the sensor magnet having the same number of internal flat surfaces as a number of said snap fit board portions, each of said snap fit board portions properly contacting a corresponding one of the flat surfaces of the sensor magnet due to the flexibility while the sensor magnet being held between said magnet rear end holding portion and said magnet front end holding portion.

2. The sensor magnet holder according to claim 1 wherein an internal diameter of said snap fit board portions is larger than that of said shaft press fit portion, a gap being formed between an outer surface of the motor shaft and said snap fit board portions, said snap fit board portions further comprising a shaft contacting portion at the extending tip over an inner diameter surface of each of said snap fit board portions.

3. The sensor magnet holder according to claim 1 wherein said magnet rear end holding portion further includes a plurality of bosses on an end surface for contacting the sensor magnet by collapsing a tip of said bosses to fix the sensor magnet in the axial direction of the motor shaft.

4. The sensor magnet holder according to claim 1 wherein said shaft press fit portion forms a flange having a larger diameter at one end.

5. A motor having a sensor magnet holder for mounting a sensor magnet on a motor shaft, the sensor magnet being provided relative to a magnetic induction sensor on the non-moving side for obtaining a signal indicative of a rotational position of the motor shaft, the sensor magnet holder comprising:
   a shaft press fit portion for press-fitting the motor shaft;
   a magnet rear end holding portion; and
   a plurality of snap fit board portions, wherein said shaft press fit portion, said magnet rear end holding portion and said snap fit board portions are integrally formed, said snap fit board portions extending from an inner diameter of said shaft press fit portion in an axial direction of the motor shaft, a magnet front end holding portion being formed at an extending tip over an outer diameter surface of each of said snap fit board portions, said snap fit board portions having flexibility, the sensor magnet having the same number of internal flat surfaces as a number of said snap fit board portions, each of said snap fit board portions properly contacting a corresponding one of the flat surfaces of the sensor magnet due to the flexibility while the sensor magnet being placed between said magnet rear end holding portion and said magnet front end holding portion.

6. A manufacturing method of a motor having a sensor magnet holder for mounting a sensor magnet on a motor shaft, the sensor magnet being provided relative to a magnetic induction sensor on the non-moving side for obtaining a signal indicative of a rotational position of the motor shaft, the manufacturing method comprising:

integrally forming a shaft press fit portion for press-fitting the motor shaft, a magnet rear end holding portion and a plurality of snap fit board portions, the snap fit board portions extending from an inner diameter of said shaft press fit portion in an axial direction of the motor shaft;

forming a magnet front end holding portion at an extending tip over an outer diameter surface of each of said snap fit board portions;

properly contacting each of the snap fit board portions to a corresponding number of flat surfaces of the sensor magnet due to flexibility of said snap fit board portions;

placing the sensor magnet between said magnet rear end holding portion and said magnet front end holding portion; and press fitting said sensor magnet holder that holds the sensor magnet onto the motor shaft.

7. A rotational sensing system for a motor, comprising;
a motor having a motor shaft;
a magnetic induction sensor located near said motor;
a sensor magnet having a plurality of flat inner surfaces;
a sensor magnet holder for holding said sensor magnet and mounted on said motor shaft, said sensor magnet holder further comprising:

a shaft press fit portion for press-fitting said motor shaft;
a magnet rear end holding portion located near said shaft press fit portion;
a plurality of flexible snap fit board portions extending from said shaft press fit portion; and
a magnet front end holding portion at an extending tip of each of said snap fit board portions, wherein each of said snap fit board portions properly contacts a corresponding one of said flat inner surfaces of said sensor magnet after said sensor magnet is placed between said magnet rear end holding portion and said magnet front end holding portion.

8. The rotational sensing system according to claim 7 wherein an internal diameter of said snap fit board portions is larger than that of said shaft press fit portion so as to form a gap between an outer surface of the motor shaft and said snap fit board portions for increasing flexibility.

9. The rotational sensing system according to claim 7 wherein said snap fit board portions further comprising a shaft contacting portion at the extending tip over an inner diameter surface of each of said snap fit board portions.

10. The rotational sensing system according to claim 7 wherein said magnet rear end holding portion further includes a plurality of bosses on an end surface for contacting said sensor magnet by collapsing a tip of said bosses to fix the sensor magnet in the axial direction of said motor shaft.

11. The rotational sensing system according to claim 7 wherein said shaft press fit portion forms a flange having a larger diameter at one end for preventing lubricating oil from reaching said magnetic induction sensor.

* * * * *